US008620372B2

(12) United States Patent
Ramasamy et al.

(10) Patent No.: US 8,620,372 B2
(45) Date of Patent: Dec. 31, 2013

(54) METHOD AND APPARATUS FOR TRANSPORT FORMAT SELECTION IN A MOBILE WIRELESS DEVICE

(75) Inventors: Venkatasubramanian Ramasamy, San Jose, CA (US); Giri Prassad Deivasigamani, San Jose, CA (US); Sharad Garg, San Jose, CA (US)

(73) Assignee: Apple Inc., Cupertino, CA (US)

( * ) Notice: Subject to any disclaimer, the term of this patent is extended or adjusted under 35 U.S.C. 154(b) by 615 days.

(21) Appl. No.: 12/895,165

(22) Filed: Sep. 30, 2010

(65) Prior Publication Data

US 2012/0083264 A1    Apr. 5, 2012

(51) Int. Cl.
    H04B 7/00      (2006.01)
    H04B 7/185     (2006.01)
(52) U.S. Cl.
    USPC .............. 455/522; 455/442; 455/69; 370/318
(58) Field of Classification Search
    USPC .............................. 455/522, 442, 69; 370/318
    See application file for complete search history.

(56) References Cited

U.S. PATENT DOCUMENTS

| 6,426,960 | B2 | 7/2002 | Antonio |
| 7,031,678 | B2 | 4/2006 | Ballantyne |
| 7,418,270 | B2 | 8/2008 | van Rensburg et al. |
| 8,229,494 | B1 * | 7/2012 | Kela et al. ............... 455/522 |
| 8,351,412 | B2 * | 1/2013 | Carmon et al. .......... 370/342 |
| 2005/0107107 | A1 | 5/2005 | Shahidi et al. |
| 2005/0185594 | A1 * | 8/2005 | Horneman et al. ........ 370/252 |
| 2007/0161394 | A1 * | 7/2007 | Kuroda et al. ............ 455/522 |
| 2007/0280171 | A1 * | 12/2007 | Carmon et al. ............ 370/335 |
| 2008/0090602 | A1 * | 4/2008 | Holma et al. .............. 455/522 |
| 2008/0175217 | A1 * | 7/2008 | Malladi et al. ............. 370/342 |
| 2008/0268918 | A1 * | 10/2008 | Dominique et al. ........ 455/574 |
| 2009/0275337 | A1 * | 11/2009 | Maeda et al. .............. 455/442 |
| 2009/0285157 | A1 | 11/2009 | Yeoum et al. |
| 2009/0285187 | A1 | 11/2009 | Leroy et al. |
| 2010/0027662 | A1 * | 2/2010 | Pigeon ................... 375/240.16 |
| 2010/0087202 | A1 | 4/2010 | Ventola et al. |
| 2010/0291931 | A1 * | 11/2010 | Suemitsu et al. ........... 455/436 |
| 2011/0143805 | A1 * | 6/2011 | Ramasamy et al. ........ 455/522 |
| 2011/0171989 | A1 * | 7/2011 | Kim et al. .................. 455/522 |
| 2011/0223904 | A1 * | 9/2011 | Fan et al. .................. 455/422.1 |
| 2011/0255515 | A1 * | 10/2011 | Maeda et al. .............. 370/331 |
| 2012/0113853 | A1 * | 5/2012 | Carmon et al. ............ 370/252 |
| 2012/0178438 | A1 * | 7/2012 | Vashi et al. ................. 455/424 |
| 2012/0224548 | A1 * | 9/2012 | Marinier et al. ............ 370/329 |

FOREIGN PATENT DOCUMENTS

WO    2009/082291    7/2009

* cited by examiner

*Primary Examiner* — Bobbak Safaipour
(74) *Attorney, Agent, or Firm* — Fay Kaplun & Marcin, LLP

(57) ABSTRACT

A method and apparatus for transport format selection in a mobile wireless communication device. During a simultaneous voice and data call, the mobile wireless communication device selects a transport format for proper uplink data transmission. Simultaneous voice and data calls require higher uplink transmit power than voice only calls. The mobile wireless communication device selects a transport format based on the uplink transmit power level. At higher transmit power levels, minimum or zero data rates are chosen to maintain sufficient power for simultaneous voice. Transmit format is specified using a transmit format combination indicator.

21 Claims, 11 Drawing Sheets

800

| | | Transport Block Size (bits) | | TTI (ms) |
|---|---|---|---|---|
| | | Voice Class A | Voice Class B | |
| DCH1 | TF1 | 80 | 100 | 20 |
| | TF2 | 40 | 0 | 20 |

| | | Transport Block Size (bits) | TTI (ms) |
|---|---|---|---|
| | | PS Data | |
| DCH2 | TF3 | 0 | 10 |
| | TF4 | 200 | 10 |
| | TF5 | 500 | 10 |
| | TF6 | 1000 | 10 |

802

| | | Transport Channel | |
|---|---|---|---|
| | | DCH1 | DCH2 |
| Transport Format Combination | TFCI1 | TF1 | TF3 |
| | TFCI2 | TF1 | TF4 |
| | TFCI3 | TF2 | TF5 |
| | TFCI4 | TF2 | TF6 |

Figure 8

METHOD AND APPARATUS FOR TRANSPORT FORMAT SELECTION IN A MOBILE WIRELESS DEVICE

TECHNICAL FIELD

The described embodiments relate generally to wireless mobile communications. More particularly, a method and apparatus is described for transport format selection in a mobile wireless communication device.

BACKGROUND OF THE INVENTION

Mobile wireless communication devices, such as a cellular telephone or a wireless personal digital assistant, can provide a wide variety of communication services including, for example, voice communication, text messaging, internet browsing, and electronic mail. Mobile wireless communication devices can operate in a wireless communication network of overlapping "cells", each cell providing a geographic area of wireless signal coverage that extends from a radio network subsystem (RNS) located in the cell. The radio network subsystem can include a base transceiver station (BTS) in a Global System for Communications (GSM) network or a Node B in a Universal Mobile Telecommunications System (UMTS) network. Whether idle or actively connected, a mobile wireless communication device can be associated with a "serving" cell in a wireless communication network and be aware of neighbor cells to which the mobile wireless communication device can also associate.

Mobile wireless communication devices can support both voice and data connections, in some cases simultaneously, through radio resources allocated by the radio network subsystem located in the cell. The allocated radio resources can determine a portion of the radio frequency spectrum that the mobile wireless communication device can use when transmitting and receiving signals over a radio access portion of the wireless communication network. Multiple simultaneous data connections between the mobile wireless communication device and the wireless communication network can also be supported. The voice and data connections can include paths through circuit switched and/or packet switched domains of a core network that interconnects the mobile wireless communication device to a public switched telephone network (PSTN) and/or a public data network (PDN). Radio resources in the wireless access network can be limited, with multiple mobile wireless communication devices sharing an uplink connection to the wireless access network using frequency division, time division, code division multiplexing methods or a combination thereof. The wireless access network can limit the maximum transmit power at which a mobile wireless device can transmit in order to minimize interference between the multiple mobile wireless communication devices sharing the uplink connections.

Within the maximum transmit power limit specified by the wireless access network, a mobile wireless communication device can determine a combination of voice and data packets to transmit to the wireless access network during a transmit time interval. The combination of voice and data packets used and properties of the packet's formats on a transport channel can be communicated to the wireless access network using a transport format combination indicator. The wireless communication network can provide to the mobile wireless communication device a set of transport format combinations that can be used. Each permissible transport format combination can be specified by one of the transport format combination indicators.

As higher rate data packets can require more transmit power than lower rate voice packets, when the mobile wireless communication device transmits, the mobile wireless communication device can select a transport format combination that balances transmit power with packet prioritization. When the mobile wireless communication device transmits at maximum transmit power, all of the transport format combinations that include data transmissions can require a higher transmit power than can be available. Transmitting data at a lower transmit power than required can result in higher data packet error rates, and ultimately a reset of the data connection can occur. Consequently all other simultaneous connections between the mobile wireless communication device and the wireless access network, such as a voice connection, can also be severed when the data connection is reset. This can result in an undesirable call drop between the mobile wireless communication device and the wireless access network.

Thus there exists a need to modify transport format selection to account for transmit power levels and for a mixture of voice and data packets to maintain a stable connection between the mobile wireless communication device and the wireless access network.

SUMMARY OF THE DESCRIBED EMBODIMENTS

The described embodiments relate generally to wireless mobile communications. More particularly, a method and apparatus is described for transport format selection in a mobile wireless communication device.

In one embodiment, a method for transport format combination selection in a mobile wireless communication device, when connected to a wireless communication network through a first and a second connection simultaneously, can include at least the following steps. In the mobile wireless communication device, monitoring an uplink transmit power level and selecting a first and a second transport formation combination based on the monitored uplink transmit power level. The first transport format combination transmits frames over the first connection but does not transmit frames over the second connection, while the second transport format combination transmits frames over both the first connection and over the second connection. The first transport format combination is selected when the monitored uplink transmit power level equals or exceeds a first threshold, while the second transport format combination is selected when the monitored uplink transmit power level equals or exceeds a second threshold and falls below the first threshold. In some embodiments, the first and second transport format combinations are specified by the wireless communication network.

In another embodiment, a mobile wireless communication device includes an application processor and a transceiver. The transceiver is coupled to the application processor and also is connected to a wireless communication network by a first connection and a second connection. The transceiver in the mobile wireless communication device selects a transmission format for transmissions during a transmit time interval by estimating an uplink transmit power level and selecting the transmission format based on the estimated uplink transmit power level. The first transmission format specifies transmitting a non-zero amount of frames over the first connection and zero frames over the second connection. The second transmission format specifies transmitting a non-zero amount of frames over the first connection and the second connection. The first transmission format is selected by the transceiver when the estimated uplink transmit power level equals or exceeds a first threshold. The second transmission format is selected by the transceiver when the estimated uplink transmit power level equals or exceeds a second threshold and falls below the first threshold. In some embodiments, the first connection is a circuit switched voice connection and the second connection is a packet switched data connection.

In yet another embodiment, a computer readable medium for storing non-transitory computer program code executable by a processor in a mobile wireless communication device for selecting a transmission format comprises the following elements. When the mobile wireless communication device is connected to a wireless communication network through a first connection and a second connection simultaneously, non-transitory computer program code for estimates an uplink transmit power level. Additional non-transitory computer program code selects a first transmission format that transmits frames over the first connection and does not transmit frames over the second connection during a transmit time interval when the estimated uplink transmit power level equals or exceeds a first threshold. Further non-transitory computer program code selects a second transmission format that transmits frames over the first connection and over the second connection during the transmit time interval when the estimated uplink transmit power level equals or exceeds a second threshold and falls below the first threshold.

BRIEF DESCRIPTION OF THE DRAWINGS

The invention and the advantages thereof may best be understood by reference to the following description taken in conjunction with the accompanying drawings.

FIG. 8 illustrates a transport format combination table that can specify transport block characteristics and transport format combinations using indicators.

DETAILED DESCRIPTION OF EXAMPLE EMBODIMENTS

Figure 1:
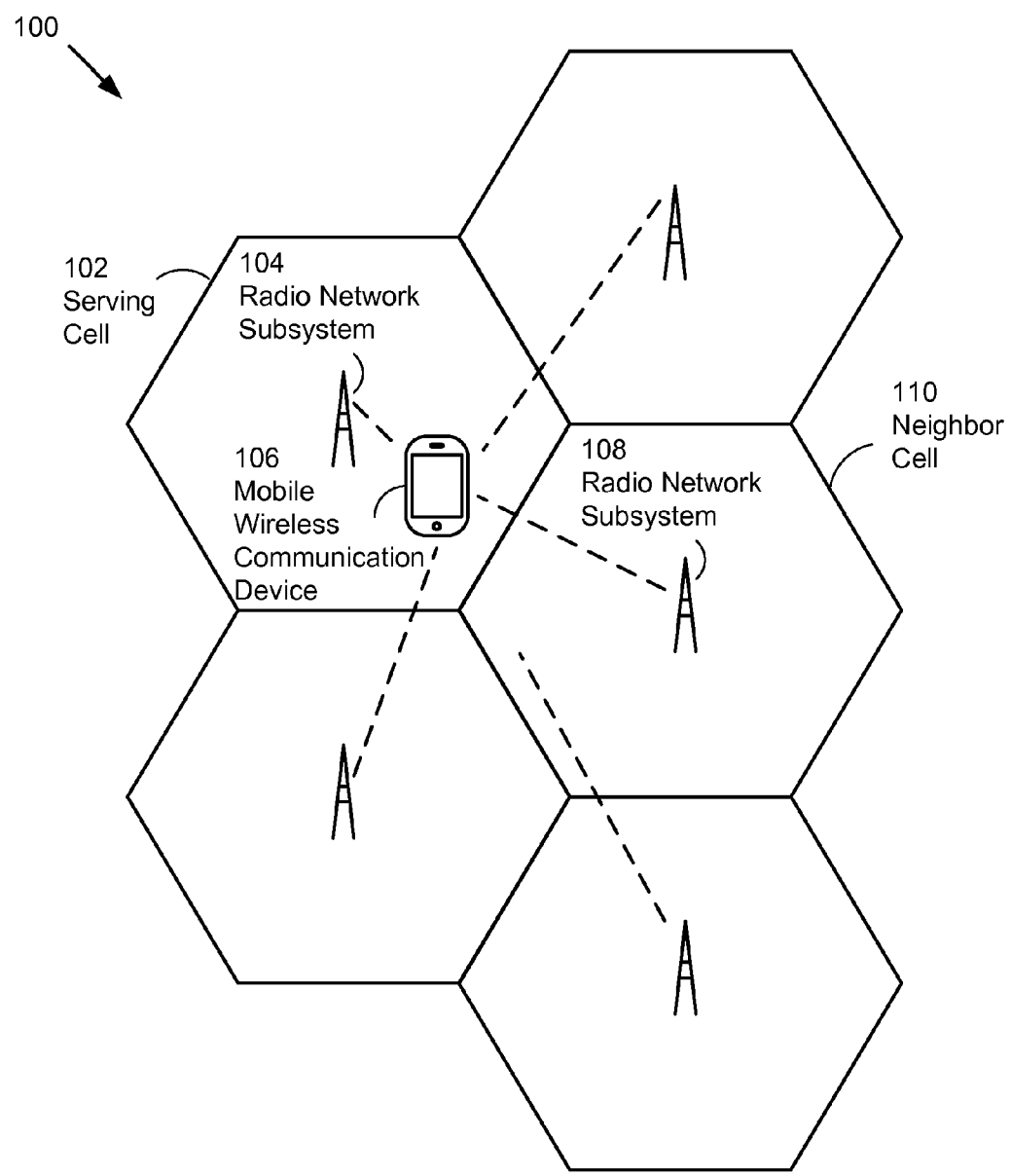
FIG. 1 illustrates a mobile wireless communication device located within a wireless cellular communication network.

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

Mobile wireless communication devices can provide a multiplicity of services including both voice and data connections through wireless communication networks. A data connection between a mobile wireless communication device and an external data network, through a wireless communication network, can be considered "active" when the mobile wireless communication device is "attached" to the wireless communication network and when a "higher layer" packet data protocol (PDP) context is established. Radio access network resources, such as radio access bearers (RABs) can be used to transport packets, also called protocol data units (PDUs), between the mobile wireless communication device and radio network subsystems in a radio access portion of the wireless communication network. Radio access network resources can be shared among multiple mobile wireless communication devices, and to reduce interference between the multiple mobile wireless communication devices, the transmit power of each mobile wireless communication device can be regulated by the wireless communication network.

Several mechanisms can coexist that can influence the transmit power chosen by the mobile wireless communication device to use during a transmit time interval (TTI). Radio network subsystems in the radio access portion of the wireless communication network can issue grants to the mobile wireless communication device that can limit the maximum transmit power level at which the mobile wireless communication device can transmit. Different data rate transmissions can require different amounts of transmit power, and the mobile wireless communication device can choose how much data to transmit in a given TTI based on how much data exists in buffers ready for transmission. By selecting a particular data rate, the mobile wireless communication device can indirectly affect the amount of transmit power used during the TTI.

Voice connections, which can have relatively lower transmission rates than data connections, can exist simultaneously with one or more data transmissions. Typically, a voice connection can have priority over a simultaneous data connection when resources for transmission are limited. Thus, the mobile wireless communication device can select data rates for transmissions based on whether a voice connection also uses the same TTI. The transmit power used by the mobile wireless device can also account for attenuation that transmitted signals can incur to reach the radio network subsystem in the access portion of the wireless communication network. Transmissions from mobile wireless communication devices located farther away from the radio network subsystem can require more transmit power than transmissions from mobile wireless communication devices located at a shorter distance to the radio network subsystem. The transmit power, however, can be limited to a maximum by the wireless communication network as specified by absolute and relative grants.

During each TTI, the mobile wireless communication device can select a transport format combination (TFC) that can include a mixture of voice packets and data packets from multiple simultaneous connections between the mobile wireless communication device and the wireless communication network. A transport format combination can include voice only, data only or both voice and data, and data can be included at different rates. Both the wireless communication network and the mobile wireless communication device can maintain one or more tables of permissible transmit format combinations, and the mobile wireless communication device can inform the radio network subsystem in the wireless communication network which transport format combination is selected for transmission during a TTI by sending a transport format combination indicator (TFCI) along with the voice and data packets.

Using the TFCI communicated from the mobile wireless communication device, the radio network subsystem can appropriately parse the received data into multiple packets for parallel voice and data connections. Different TFCs can specify different amounts of data and also can also require different amounts of transmit power to carry the different amounts of data. When the mobile wireless communication device transmits at levels approaching a maximum transmit power level permitted, the mobile wireless communication device can prioritize voice over data by lowering the amount of data transmitted. Minimizing the amount of transmitted data in the TTI can limit the amount of transmit power required for that TTI.

When the mobile wireless communication device reaches a level close to the maximum transmit power, the TFCs that use any data, including those for the least non-zero amount of data can require more transmit power than available. Transmitting a non-zero amount of data using the maximum transmit power level in this circumstance can result in incorrectly received data packets at the radio network subsystem. With sufficient data packets received in error over a data connection, the wireless communication network can disconnect the errant data connection resulting in all concurrent voice and data connections being terminated between the radio network subsystem and the mobile wireless communication device. For the user of the mobile wireless communication device, a data connection can thus adversely impact a simultaneous voice connection.

To limit the impact of inadequate transmit power for data connections, the mobile wireless communication device can select a transport format combination with minimal or no data packets, thereby throttling the data at high uplink transmit power levels. When the radio frequency conditions improve, e.g. the required transmit power levels decrease, the mobile wireless communication device can return to selecting the transport format combination based on transmit power headroom available or on data buffer fullness, or a combination of both factors. By limiting transmissions to voice only during periods of high transmit power, the mobile wireless communication device can avoid termination of the data connections and thereby improve call drop performance.

FIG. 1 illustrates a wireless communication network 100 of overlapping wireless communication cells to which a mobile wireless communication device 106 can connect. The wireless communication network 100 can operate according to one or more different communication protocols such as a Global System for Communications (GSM) protocol, a Universal Mobile Telecommunications System (UMTS) protocol or a Long Term Evolution (LTE) protocol developed and maintained by the Third Generation Partnership Project (3GPP), a collaboration of several telecommunication standards organizations. Alternatively, the wireless communication network 100 can operate using one of the set of Code Division Multiple Access 2000 (CDMA2000) standards developed by the 3GPP2. The discussion herein will primarily focus on wideband CDMA (WCDMA) as defined in UMTS, but the same ideas can apply to other wireless access network technologies.

Each wireless communication cell can cover a geographic area extending from a centralized radio network subsystem (RNS). Representative mobile wireless communication devices 106 can include "smart" phones and mobile computing devices having wireless connectivity capabilities. The mobile wireless communication device 106 can receive communication signals from a number of different cells in the wireless communication network 100, each cell located at a different distance from the mobile wireless communication device 106. The mobile wireless communication device 106 can be connected to a radio network subsystem 104 in a serving cell 102 and can be aware of neighbor cells in the wireless communication network 100, such as radio network subsystem 108 in neighbor cell 110. The radio resources that connect the mobile wireless communication device 106 to a cell can be limited and shared among multiple mobile wireless communication devices.

As radio frequency energy of a transmission can decrease with distance traveled, the mobile wireless communication device 106 can transmit at higher power levels when located farther away from the radio network subsystem 104 than when located closer. Transmitting at a higher power level by the mobile wireless communication device 106 can ensure signals received at the radio network subsystem 104 in the serving cell 102 can meet a required reception level. As multiple mobile wireless communication devices 106 can share the same radio frequency spectrum when transmitting in the uplink direction to the radio network subsystem, the wireless communication network 100 can limit the maximum transmit level of the mobile wireless communication device 106 during any particular transmit time interval (TTI) to minimize interference between different mobile wireless communication devices 106.

Figure 2:
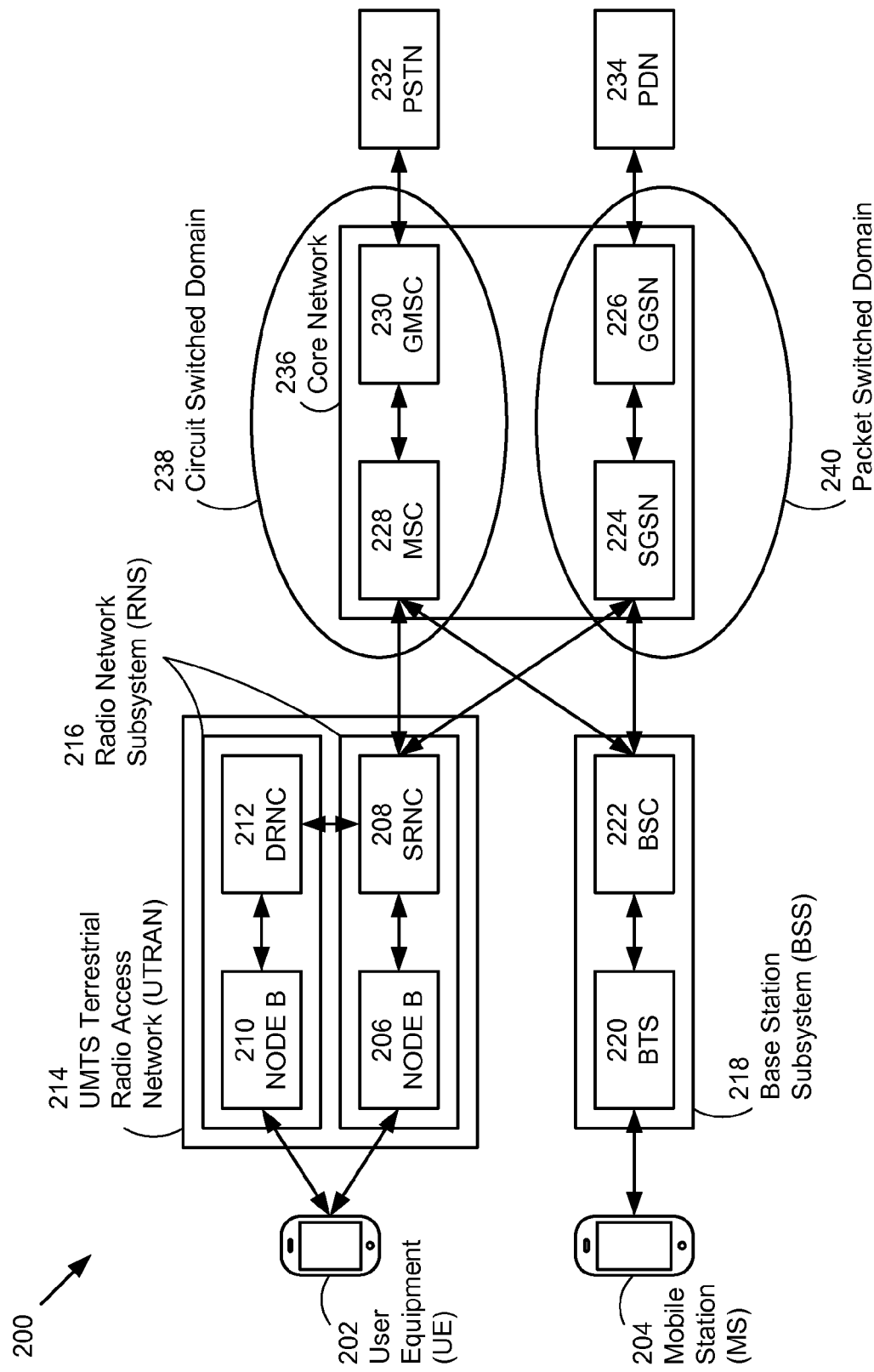
FIG. 2 illustrates a hierarchical architecture for a wireless communication network.

FIG. 2 illustrates a hybrid hierarchical architecture 200 for a wireless communication network that includes both UMTS and GSM radio access network elements. A mobile wireless communication device 106 operating in a GSM wireless communication network can be referred to as a mobile station (MS) 204, while a mobile wireless communication device 106 operating in a UMTS network can be referred to as user equipment (UE) 202. (Wireless mobile communication devices 106 can include the capability of connecting to multiple wireless communication networks that use different wireless radio network technologies, such as to a GSM network and to a UMTS network; thus the description that follows can also apply to such "multi-network" devices as well as single network devices.) The MS 204 can connect to the GSM wireless communication network through a radio network subsystem known as a base station subsystem (BSS) 218. The BSS 218 can include a base transceiver station (BTS) 220 that transmits and receive radio frequency signals between the MS 204 and the wireless communication network and a base station controller (BSC) 222 that manages the communication between a core network 236 and the MS 204. In a GSM wireless communication network, an MS 204 can be connected to one BSS 218 at a time. As the MS 204 moves throughout the GSM wireless communication network, the BSC 222 can manage handover of the MS 204 to different BTS 220 located in different cells. The GSM radio access network BSS 218 connects to a centralized core network 236 that provides circuit switching and packet switching capabilities. The packet switching capability can provide a General Packet Radio Service (GPRS) that transmits internet protocol (IP) packets between the MS 204 and external data networks.

The core network 236 can include a circuit switched domain 238 that can carry voice traffic to and from an external public switched telephone network (PSTN) and a packet switched domain 240 that can carry data traffic to and from an external public data network (PDN). The circuit switched domain 238 can include multiple mobile switching centers (MSC) 228 that connect a mobile subscriber to other mobile subscribers or to subscribers on other networks through gateway MSCs (GMSC) 230. The packet switched domain 240 can include multiple support nodes, referred to as serving GPRS support nodes (SGSN) 224, that route data traffic among mobile subscribers and to other data sources and sinks in the PDN 234 through one or more gateway GPRS support nodes (GGSN) 226. The core network 236 can be commonly used by multiple radio link access network subsystems that use different radio link technologies. As shown in FIG. 2, both a UMTS terrestrial radio access network (UTRAN) 214 and a GSM BSS 218 can connect to the same core network 236.

The circuit switched domain 238 and the packet switched domain 240 of the core network 236 can each operate in parallel, and both domains can connect to different radio access networks simultaneously. The UTRAN 214 in the UMTS wireless access network can include multiple radio network subsystems (RNS) 216. Each RNS 216 can include a "Node B" 206/210 that transmits and receives radio frequency signals and a radio network controller (RNC) 208/212 that manages communication between the "Node B" 206/210 network elements and the core network 236. Unlike the MS 204 in the GSM radio access network, the UE 202 can connect to more than one radio network subsystem (RNS) 216 simultaneously. One RNS 216 can include a "serving" radio network controller (SRNC) 208 that maintains the logical connection between the UE 202 and the core network 236 through a primary Node B 206. A second RNS 216 can include a "drift" radio network controller (DRNC) 208 that provides additional radio link resources through a secondary Node B 210 that supplements the radio link through the primary Node B 206.

A UMTS wireless communication network can use a wireless communication radio link technology known as wideband code division multiple access (W-CDMA). W-CDMA transmissions can occupy a relatively wide bandwidth based on a direct sequence spread spectrum modulation. Transmissions between a UE 202 and an RNS 216 in a UMTS network can be modulated by a spreading code, and each UE 202 connected to the RNS 216 can use a different spreading code but transmit simultaneously using the same radio frequency spectrum. Received signals can be demodulated by the Node B 206/210 by correlating the received signals with a correctly matched de-spreading code. As a set of spreading codes used in W-CDMA transmissions can be mutually orthogonal, uplink transmission signals from a particular UE 202 can be separated from uplink signals transmitted from other UE, even though all of the uplink transmission signals can overlap and use the same radio frequency spectrum simultaneously. UMTS spread spectrum signals can occupy a wider 5 MHz channel bandwidth compared with a narrower 200 kHz channel bandwidth used by GSM signals.

In order for the UE 202 to communication to the RNS 216, a radio resource, such as a radio access bearer (RAB) having a particular frequency and spreading code, can be allocated by the RNS 216 in response to a service request from the UE 202. Radio resources can be allocated when requested and available and de-allocated when not used in order to share the radio frequency spectrum among multiple UEs 202. To use the GPRS capability of the wireless communication network, the UE 202 can "attach" to the network and "activate" a packet data protocol (PDP) context. By attaching to the network, the UE 202 can identify itself, and in response, the wireless communication network 100 can confirm the location of the UE 202. Activating the PDP context can enable IP traffic transfer using radio frequency resources over an "air" interface through an access portion of the wireless communication network between the UE 202 and the RNS 216. The UE 202 can obtain an IP address and can establish a logical connection with a quality of service (QoS) profile through the UMTS network.

A UE 202 can have multiple PDP contexts active simultaneously, and each PDP context can use a different RAB. Similarly, the UE 202 can request and obtain a RAB between the UE 202 and the RNS 216 to use for a circuit switched voice connection to the PSTN 232. The UE 202 can transmit simultaneously over one RAB for voice and one or more additional RABs for data. In such a multiple RAB connection, the available transmit power can be shared by the simultaneous voice and data connections. Data connections can transmit at higher data rates than voice connections, and consequently data connections can require more transmit power than voice connections to provide the same immunity to interference. Alternatively, the data connection can transmit at the same transmit power but can reduce separation between adjacent signals, thereby increasing vulnerability to interfering noise. When transmitting at a maximum available power level over longer distances between the UE 202 and the RNS 216, the data connection on one RAB can be more sensitive to errors produced by interference than a simultaneous voice connection on a separate RAB. A disconnect of the data connection due to unrecoverable errors can cause the simultaneous voice connection also to be dropped.

Figure 3:
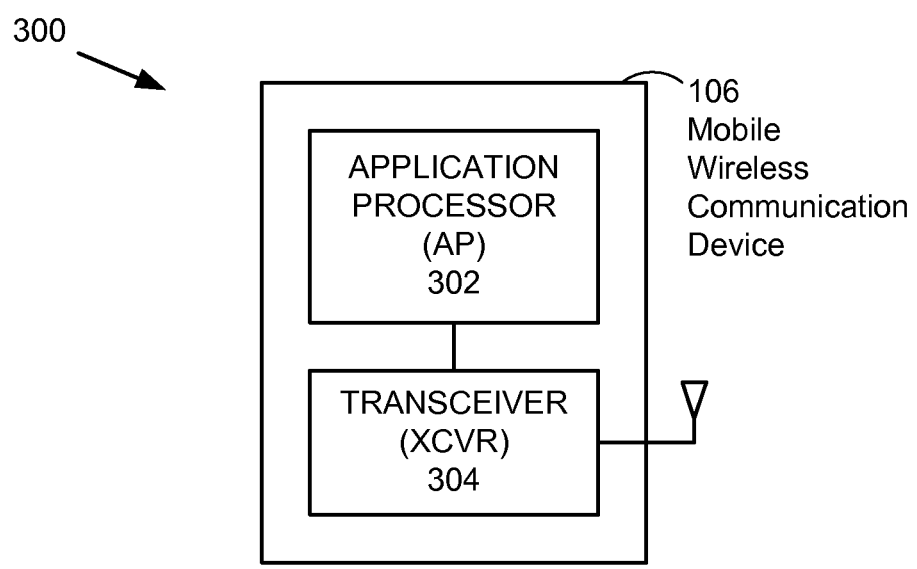
FIG. 3 illustrates components of the mobile wireless communication device.

FIG. 3 illustrates typical components of the mobile wireless communication device 106 such as the UE 202. An applications processor (AP) 302 can perform higher layer functions, such as maintaining an IP stack and requesting and releasing data connections. A transceiver (XCVR) 304 in the mobile wireless communication device 106 can transmit and receive lower layer packets that correspond to higher layer signaling and data packets through a radio "air" interface to the RNS 216 in the wireless communication network 100. In some embodiments, the application processor 302 and the transceiver 304 can be separate devices, while in other embodiments functions performed by the application processor 302 and the transceiver 304 can be combined in a single device.

Figure 4:
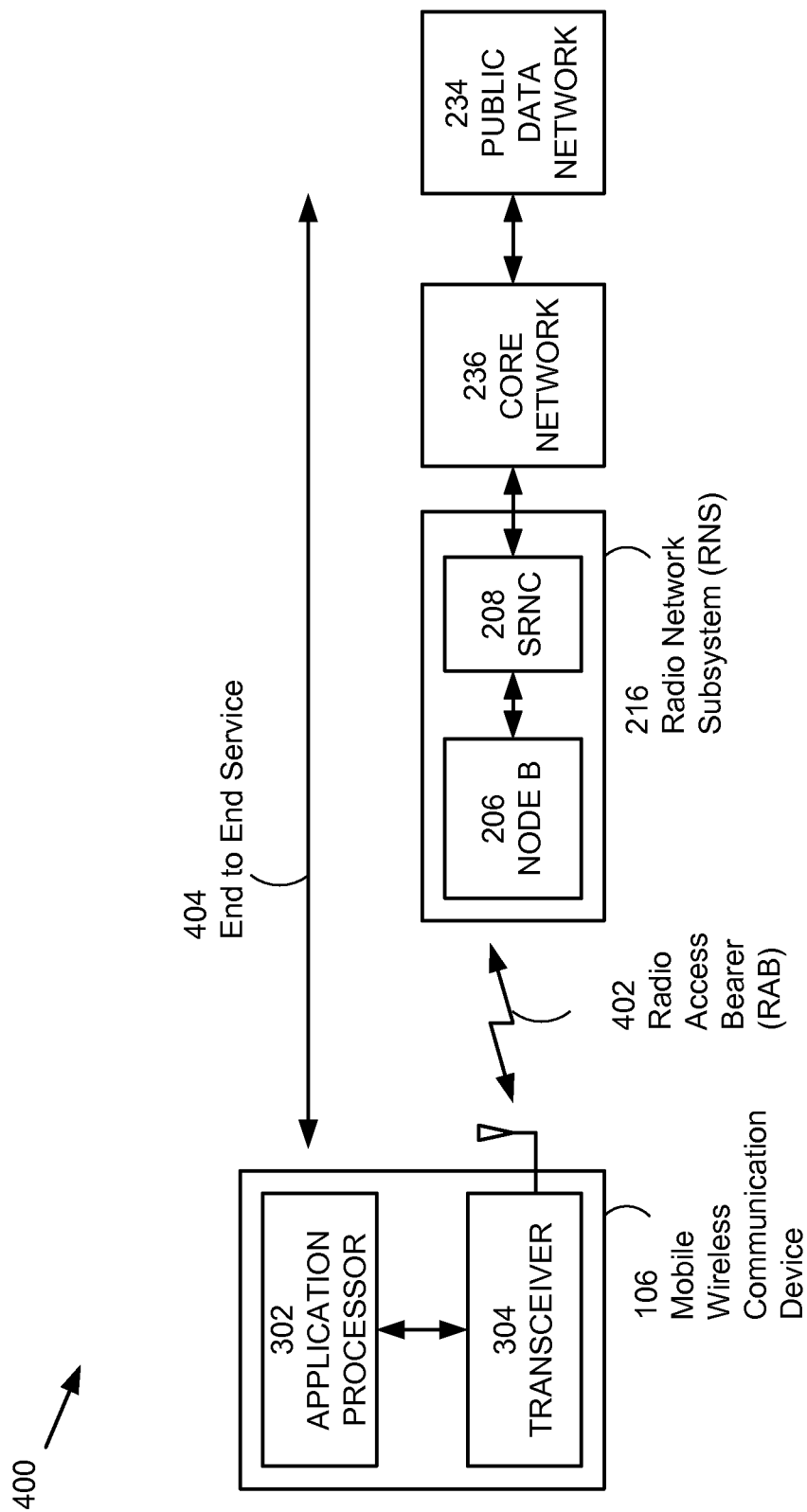
FIG. 4 illustrates connections of the mobile wireless communication device to elements of the wireless communication network.

FIG. 4 illustrates the mobile wireless communication device 106 connected to the public data network 234 to provide an end to end service 404 between the application processor 302 in the mobile wireless communication device 106 and an endpoint (not shown) in (or attached to) the public data network (PDN) 234. The end to end service 404 can operate at an application level and can use a set of interconnected bearers to transport IP packets between the mobile wireless communication device 106 and the endpoint in the PDN 234. Different bearers can be used to connect between individual nodes within the connection. A radio access bearer (RAB) 402 can connect between the transceiver 304 in the mobile wireless communication device 106 and the RNS 216 in the wireless access portion of the wireless communication network. Additional bearer services within the wireless communication network can exist (although not shown explicitly in FIG. 4). Bearers can exist within the core network 236, and additional bearers can connect a gateway (such as the GGSN 226 in the packet switched domain 240 of the CN 236) to the endpoint in the PDN 234.

In order for the wireless mobile communication device 106 to communicate to the RNS 216, a radio access bearer 402 having a particular radio frequency and spreading code can be allocated by the RNS 216 in response to a service request from the UE 202. Radio resources can be allocated when requested and available and can be de-allocated when not used in order to share a radio frequency spectrum among multiple mobile wireless communication devices 106. Characteristics of a RAB 402 can depend upon the service which the RAB 402 supports, and thus different RABs 402 can have different quality of service (QoS) characteristics. A service with strict real-time requirements, such as a voice telephony call, can require low delay and a reserved amount of radio resources that guarantees a minimum throughput. Other services with less real-time requirements, such as internet browsing or file downloading, can allow greater delay and a "best effort" throughput that can provide no guaranteed amount of radio resources.

A circuit switched (CS) voice connection between the mobile wireless communication device 106 and the RNS 216 can use a first RAB 402 with a first QoS profile, while a simultaneous packet switched (PS) data connection between the mobile wireless communication device 106 and the RNS 216 can use a second RAB 402 with a second QoS profile. The core network (CN) 236 can select an appropriate RAB 402 for a service requested by the UE 202, and the serving RNC (SRNC) 208 can allocate the RAB 402 as directed by the CN 236. In addition to RABs 402 that support paths for CS voice and PS data connections, the RNS 216 can use signaling radio bearers between the mobile wireless communication device 106 and the RNS 216 for radio resource control (RRC) to manage the radio connections between the RNS 216 and the mobile wireless communication device 106.

Figure 5:
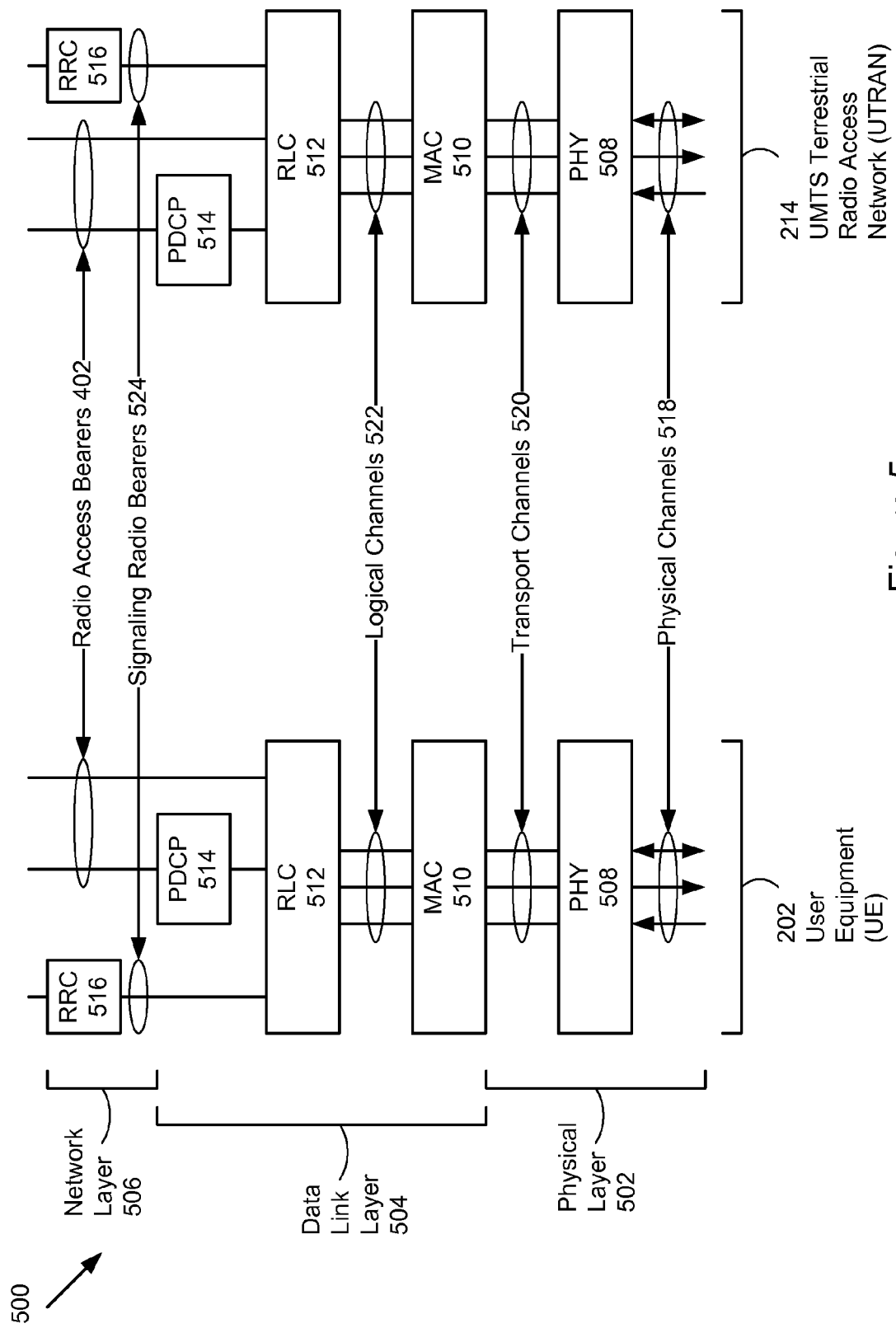
FIG. 5 illustrates a stack of communication protocol layers in the mobile wireless communication device connected by channels to a parallel stack in the wireless communication network.

FIG. 5 illustrates portions of a representative hierarchical stack 500 of wireless communication protocols that can be used by the mobile wireless communication device 106 as well as by processing blocks in nodes across the communication link for an end to end service 406. The application processor 302 in the mobile wireless communication device 106 can process application data through higher layers (not shown) and then transfer packets to the transceiver 304 for further processing into an appropriate form for transmission to the wireless communication network over the wireless radio access bearer (RAB) 402. Data carrying radio access bearers 402 and control carrying signaling radio bearers 524 can provide data traffic and control signaling connections at a network layer 506 between the UE 202 and the UTRAN 214 in the wireless communication network 100. Radio resource control (RRC) 516 in the network layer 506 can set up, modify and tear down the radio access bearers 402 as required for voice and data connections.

The transceiver 304 in the mobile wireless communication device 106 (equivalently the UE 202) can include processing elements to implement a data link layer 504 (also called a link layer) that includes several sub-layers. The data link layer 504 can include a packet data convergence protocol (PDCP) 514 sub-layer, a radio link control (RLC) 512 sub-layer and a medium access control (MAC) 510 sub-layer. The higher layers (not shown) in the protocol stack can be independent of any physical hardware networking technology used to transmit and receive data over a physical medium. The lower layers can convert packets from a form appropriate for applications that use the higher layers into a form appropriate for transmission on the physical medium. This transformation can include aggregating smaller packets, dividing larger packets, appending headers and trailers, adding error correction and other processing to ensure a packet can be transmitted and received reliably through the physical transmission medium used.

The PDCP 514 layer can perform IP header compression and decompression on an IP packet received from higher layers. The RLC 512 sub-layer can segment and reassemble the modified IP packet into a sequence of link layer protocol data units (PDUs). In an acknowledged mode, at a receiving end of a connection the RLC 512 sub-layer can ensure all link layer PDUs are received correctly before reassembling the IP packet. The MAC 510 sub-layer can multiplex and de-multiplex the link layer PDUs into transport blocks delivered to transport channels at the physical (PHY) layer 502. Different physical transport protocols at the PHY layer 502 can be used for different physical media, such as different wireless access radio technologies as specified in wireless protocols including GSM, UMTS, CDMA2000 and LTE. A radio resource control (RRC) 516 processing unit at the network layer 506 can provide control of the data link layer 504 and physical layer 502.

Layered communication protocol stacks can be used to separate functions into distinct units separated by well defined interfaces. Individual layers can be subdivided into multiple sub-layers, and each layer or sub-layer can transmit and receive protocol data units (PDUs) having a specific format for that layer or sub-layer. A protocol layer in one entity at one end of a connection can provide guaranteed delivery or best effort delivery of PDUs associated with that protocol layer to a parallel protocol layer in an entity at the other end of the connection. For the connected protocol stacks shown in FIG. 5, logical channels 522 can support exchanges of RLC 512 layer PDUs, while transport channels 520 can support exchanges of MAC 510 layer PDUs.

The physical layer 502, the lowest layer in the protocol stack 500, can provide physical channels 518 that can transmit and receive signals over the radio "air" interface. A physical transport (PHY) unit 508 in the physical layer 502 can map transport channels 520 to the physical channels 518 using transmit functions that can include channel coding, mapping, spreading, modulation and amplification and receive functions that can include amplification, demodulation, de-spreading, inverse mapping and channel decoding. The physical layer 502 can primarily operate at a "bit" or "symbol" level and can seek to transport sequences of bits/symbols below an acceptable error rate over a particular physical medium. The physical layer 502 can provide the transport channels 520 to the medium access control (MAC) 510 sub-layer located in the data link layer 504. The MAC 510 sub-layer can transmit and receive MAC PDUs (e.g. a formatted data block of bits or symbols) through the transport channels 520. The format for the MAC PDUs on the transport channels 520 can be set by the radio resource control (RRC) 516 unit in the network layer 506.

The MAC 510 sub-layer can include a hybrid automatic repeat request (HARQ) function that can include acknowledge (ACK) and negative acknowledge (NACK) signaling to indicate correct and incorrect reception of individual MAC layer PDUs. The ACK/NACK responses for HARQ can be transmitted on signaling physical channels that can be separate from data carrying physical channels. Some transport channels 520 can be commonly shared among multiple UEs 202, such as broadcast channels, paging channels and control channels. Other transport channels 520 can be dedicated to an individual UE 202 such as a data transport channel. The MAC 510 sub-layer can map transport channels 520 to logical channels 522 that can be classified according to the type of information they transport, typically those used for voice or data traffic and others used for control functions.

The radio link control (RLC) 512 sub-layer in the data link layer 504 at a transmitting end can format Packet Data Convergence Protocol (PDCP) PDUs received from a PDCP 514 unit into sequences of RLC PDUs transmitted over the logical channels 522. Formatting can include segmenting and/or concatenating PDCP PDUs to fit an RLC PDU size. At a receiving end, the RLC 512 sub-layer can reconstruct PDCP PDUs from a sequence of RLC PDUs. When operating in an acknowledged mode, the RLC 512 sub-layer in a transmitting entity can assure correct delivery of a sequence of RLC data PDUs at a receiving entity by monitoring RLC acknowledgement responses (or lack thereof) in RLC status PDUs received from the RLC 512 sub-layer in the receiving entity. RLC Status PDUs for the downlink RLC data PDUs can be transmitted in the uplink direction along with uplink RLC data PDUs, and thus congestion in uplink data transmission can adversely affect downlink data transmission when status RLC status PDUs cannot be received by the RLC 512 sub-layer in the transmitting entity.

The RLC 512 sub-layer can map logical channels 522 to radio access bearers (RABs) 402 that can carry the CS voice and PS data traffic to switching units in the core network 236. The PDCP 514 unit can provide format conversion between IP packets used by a packet switched (PS) data unit (not shown) and the packet formats used by the RLC 512 sub-layer. The RLC 512 sub-layer can also map some logical channels 522 to signaling radio bearers 524 that can carry signaling messages to the radio resource control (RRC) block 516 that manage the radio connections, including establishing, maintaining and tearing down of the radio access bearers 328 and their corresponding mapped channels at the lower layers.

Figure 6:
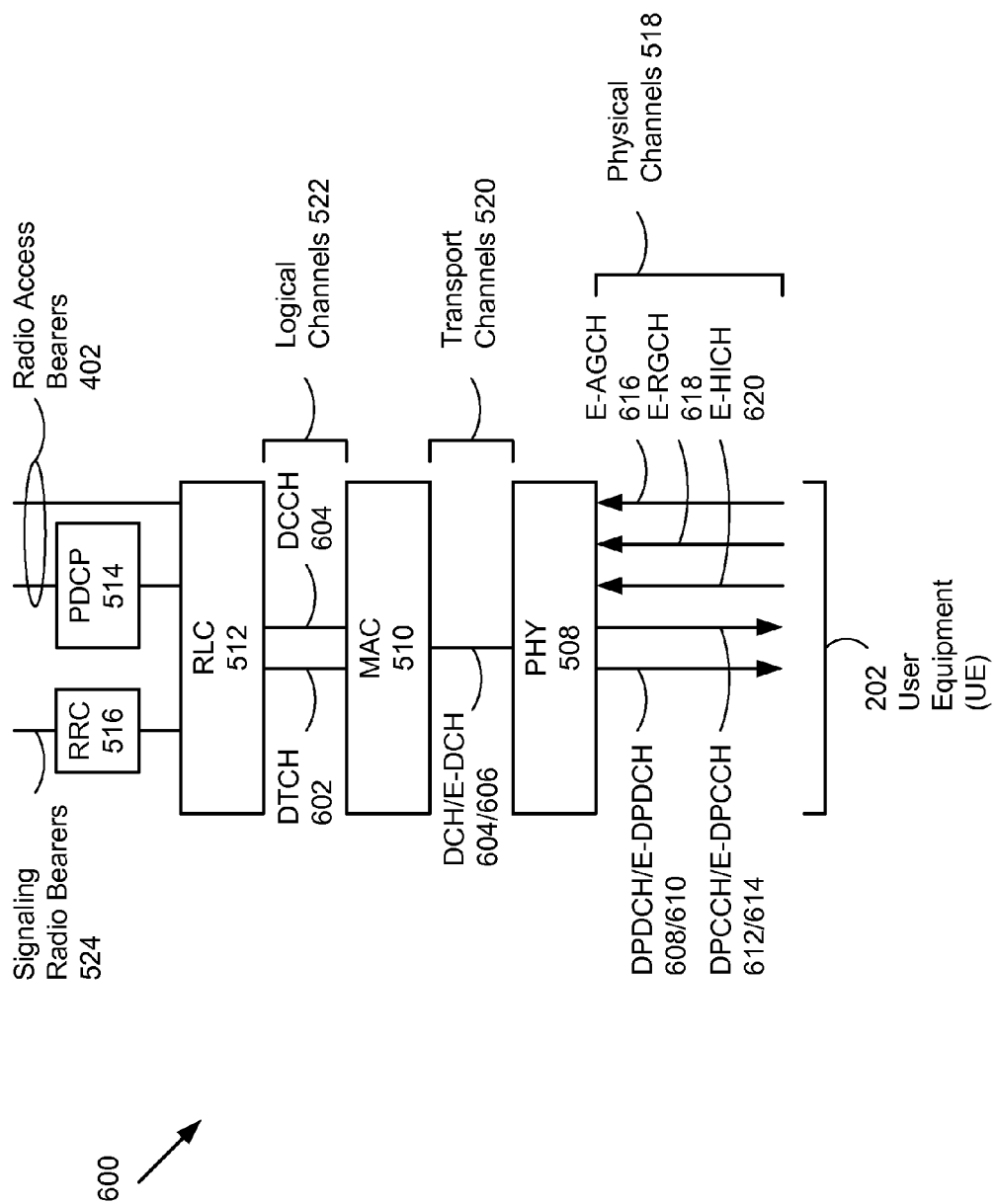
FIG. 6 illustrates a set of channels for an uplink connection between the mobile wireless communication device and an access portion of the wireless communication network.

FIG. 6 illustrates a set of channels 600 arranged between sub-layers of a communication stack that can be used by the UE 202 to support transmission and reception of packetized data connections between the UE 202 and the RNS 216 in the wireless communication network based on a UMTS communication protocol. The set of channels 600 can correspond to representative channels for the logical channels 522, transport channels 520 and physical channels 518 shown in FIG. 5. The set of channels 600 can provide lower layer connections to support data and voice connections through one or more radio access bearers 402 and accompanying control signaling through signaling radio bearers 524.

Data transfer for the MAC sub-layer 510 can use a point-to-point logical channel known as a dedicated traffic channel (DTCH) 602 that can be used for the transfer of data for a user of the UE 202 for a radio access bearer 402. The DTCH 602 can be "dedicated" to the UE 202 and can be not "shared" with other UEs 202. A separate DTCH 602 can exist in both the uplink direction (to the wireless communication network) and the downlink direction (from the wireless communication network). Control information for the MAC sub-layer 510 can use a point-to-point logical channel known as a dedicated control channel (DCCH) 604 that can be used for the transfer of control information between the UE 202 and the UTRAN 214 for a signaling radio bearer 524. The DCCH 604 can be a bi-directional channel and be established when a connection between the RRC 516 in the UE 202 and the corresponding RRC 516 in the UTRAN 214 is set up.

The MAC sub-layer 510 can provide a mapping of RLC 512 layer PDUs on the DTCH 602 and DCCH 604 logical channels to MAC 510 layer PDUs on one or more dedicated transport channels (DCHs) 604 or enhanced dedicated transport channels (E-DCHs) 606. A DCH 604 can exist in the downlink or uplink direction to support data transfer, while an E-DCH 606 can be used in the uplink direction to support high speed uplink packet access (HSUPA).

Transport channels 510 can be mapped to physical channels 518. The DCH 604 transport channel can be mapped to one or more dedicated physical data channels (DPDCH) 608, while the E-DCH 606 transport channel can be mapped to one or more enhanced dedicated physical data channels (E-DPDCH) 610. The DPDCH 608 can carry a combination of user data and higher layer signaling. A separate physical layer channel known as the dedicated physical control channel (DPCCH) 612 can carry physical layer signaling. The DPDCH 608 and the DPCCH 618 physical layer channels, both associated with the DCH 604 transport channel, can be transmitted simultaneously as parallel physical channels using in-phase and quadrature multiplexing. Similar to the DPCCH 618 physical layer control channel, an enhanced dedicated physical control channel (E-DPCCH) 614 can be used to carry physical layer signaling for the E-DPDCH 610 associated with the E-DCH 606 transport channel. In addition to the E-DPDCH 610 and E-DPCCH 614 physical channels in the uplink direction associated with an uplink E-DCH 606 transport channel, three other physical channels can be used by the wireless network to control transmission in the uplink direction. Absolute grants can be transmitted on an enhanced absolute grant channel (E-AGCH) 616 by the serving cell RNS 216. Absolute grants can be used by the serving cell RNS 216 to limit the amount of data that the UE 202 can transmit in the uplink direction. Relative grants can also be transmitted on an enhanced relative grant channel (E-RGCH) 618 by either the serving cell RNS 216 or other cells with which the UE 202 can be associated. Relative grants can be used to increment or decrement the absolute grant.

Grants can be allocated by the RNS 216 based on information provided by the UE 202. The total received noise level at the Node B 206 in the RNS 216 can be monitored to determine if more or less data traffic can be supported for the UE 202. As multiple UE 202 can share the same bandwidth, grants can be adjusted to account for this sharing "fairly" among the multiple UE 202. The RNS 216 can also monitor "happy" bits received on the E-DPCCH 614 physical channels from different UE 202 to ascertain the fullness of data buffers at the UE 202. Acknowledgements from the RNS 216 to the UE 202 for received uplink physical layer transmissions can be transported on the enhanced hybrid ARQ indicator channel (E-HICH) 620.

The MAC 510 layer PDUs (which can also be called transport blocks) carried on the transport channels can be formatted according to a transport format. The transport format can specify characteristics of the transport channel, such as a discrete TTI value, a transport block size, an error correction format, etc. Some of the transport format characteristics can be determined when the transport channel is established or "reconfigured" during a radio resource channel signaling exchange. Other transport format characteristics can be selected by the UE 202 for each transport block transmitted during a TTI. The RNS 216 can require knowledge of the transport format in order to decode correctly the received transport block. The transport format can be signaled to the RNS 216 by the UE 202 using a transport format combination indicator (TFCI) for a DCH 604 transport channel or equivalently an enhanced transport format combination indicator (E-TFCI) for an E-DCH 606 transport channel.

Multiple transport channels, i.e. multiple parallel DCH 604 or E-DCH 606 uplink transport channels can be mapped to a single physical channel, i.e. the DPDCH 608 or the E-DPDCH 610 can carry data from more than one transport channel. For example, one E-DCH 606 transport channel can transmit a transport block for a data connection, while a second E-DCH 606 transport channel can transmit a transport block for a voice connection. Both the "data" transport block and the "voice" transport block can be combined for transmission on the same E-DPDCH 610 physical layer channel. Similarly multiple "data" transport blocks for multiple transport channels can be combined into transmission on a single uplink physical channel. The UE 202 can determine how many transport blocks to combine from multiple transport channels for each TTI. The amount of data transported during a TTI can thus vary with the amount of data available in buffers and ready for transmission. A variable uplink transmission rate can thus be achieved.

When combining transport blocks from multiple transport channels, only certain combinations of transport formats can be accommodated. Each transport channel can use a different transport format during a TTI, and not all combinations of transport formats can be used together. A valid transport format combination (TFC) can be chosen by the UE 202 from a transport format combination set (TFCS) provided by the RNS 216 during call establishment or during reconfiguration. Each valid TFC in a TFCS can be identified using a transport format combination indicator (TFCI), or equivalently an enhanced transport format combination indicator (E-TFCI). The UE 202 can include the TFCI/E-TFCI when transmitting in the uplink direction, and the RNS 216 can use the TFCI/E-TFCI to separate out the multiple transport channels. The TFCI/E-TFCI can be transported on the DPCCH/E-DPCCH 612/614 physical channels respectively.

Figure 7:
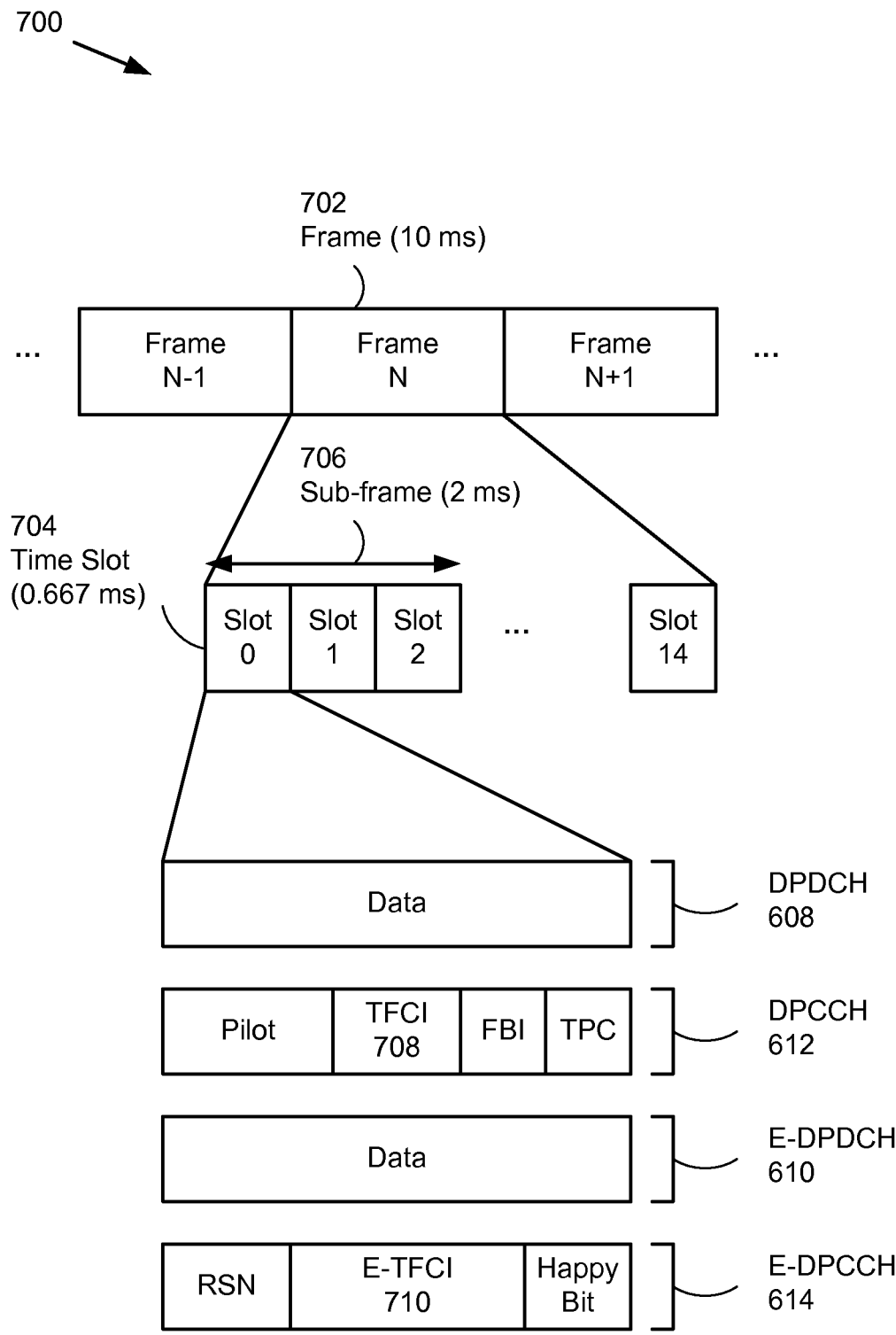
FIG. 7 illustrates a frame format for communication on a set of channels for the uplink connection between the mobile wireless communication device and the access portion of the wireless communication network.

FIG. 7 illustrates a format 700 for communication on a set of physical channels in the uplink direction from the UE 202 to the RNS 216. Communication signals over the set of physical channels can be organized into a series of frames 702, each frame can be 10 ms long and can be divided into a sequence of time slots 704 of 0.667 ms each. Each frame 702 can consist of 15 consecutive time slots 704, and three consecutive time slots can be grouped into a 2 ms long sub-frame 706. The length of frames and sub-frames can be matched to options for the length of transmit time intervals (TTIs) used on the physical channels. For example, values of TTI equal to 2 ms, 10 ms, 20 ms, 40 ms and 80 ms can be used as groups of one or more sub-frames or frames.

Within each time slot 704, data carrying physical channels, such as the DPDCH 608 and E-DPDCH 610, can transport data, while control signals can be transported simultaneously on corresponding physical layer control channels, i.e. on the DPCCH 612 and E-DPCCH 614. The format of each physical layer control channel can include a transport format combination indicator, namely a TFCI 708 for the DPCCH 612 used for the DPDCH 608 and an E-TFCI 710 used for the E-DPCCH 614. In a representative embodiment, the E-TFCI 710 can include 7 bits transported along with a "happy bit". In another representative embodiment, the TFCI 708 can include a set of bits transported along with a set of pilot bits, a set of feedback indicator (FBI) bits and a set of transmit power control (TPC) bits. The transport format combination indicator on the physical layer control channel can provide an indication by the UE 202 to the RNS 216 of a particular transport format combination (TFC) used for the data carried on the corresponding physical layer data channel during the TTI. In a representative embodiment, the RNS 216 and the UE 202 can each store a set of TFCs organized by TFC indicators such as in a table. Each TFC indicator can provide a label or a pointer to a corresponding TFC in the TFC set. Rather than communicate all of the information contained in a TFC between the UE 202 and the RNS 216 for a particular TTI, the TFC indicator can provide a more efficient means to convey the same information. The TFC set can be communicated by the wireless communication network to the UE 202 when a radio resource control connection is established and can also be updated during reconfiguration of actively connected radio access bearers.

FIG. 8 illustrates a representative table 800 of transport formats for two transport channels DCH1 and DCH2. Only a limited set of values are shown in table 800 to illustrate the concept; however, more transport formats and additional characteristics can be included. For the transport channel DCH1, two different transport formats TF1 and TF2 are described by table 800 for transport blocks that can carry bits for voice connections. A UMTS UE 202 can encode voice using different formats, such as a voice class A and a voice class B, and each voice class can use a different number of bits during a transmit time interval (TTI). The transport format TF1 for the transport channel DCH1 can specify 80 bits for a voice class A transport block and 100 bits for a voice class B transport block. The transport format TF2 for the transport channel DCH1 can specify 40 bits for a voice class A transport block and 0 bits for a voice class B transport block. For both transport formats TF1 and TF2, the TTI can be 20 ms. Table 800 also specifies a set of transport formats TF3, TF4, TF5 and TF6 for the transport channel DCH2. The transport channel DCH2 can be used to transport packet switched data in transport blocks having a size of 0, 200, 500 and 1000 bits over transmit time interval of 10 ms. Transport blocks for both transport channels DCH1 and DCH2 can be combined and transported on one or more DPDCH physical layer channels.

Additional transport format characteristics can be included in the transport format table combination table 802 to those shown in FIG. 8 including a direct or indirect measure of transmit power that can be required when using each transport format combination in the transport format combination table 802. The measure of transmit power can be expressed as an absolute number or as a relative number, e.g. an absolute transmit power level in dBm or a relative gain in dB compared against a reference power level expressed in dBm. The reference power level can represent an amount of transmit power used during a transmit time interval over the DPCCH/E-DPCCH 612/614 physical layer channel, while the measure of transmit power can represent an amount of transmit power used during a transmit time interval over the DPDCH/E-DPDCH 608/610 physical layer channel. Transmit format combinations that use only voice can have lower values for the measure of transmit power, while transmit format combinations that use a combination of data and voice can have higher values for the measure of transmit power. For transmit format combinations that specify both voice and data transmissions, higher data rates for the data transmissions can have higher measures of transmit power. A transmit format combination can be selected based on the rate of data transmission or on the measure of transmit power or a combination of both.

Table 802 in FIG. 8 summarizes a valid set of transport format combinations that can be used by the UE 202 when sending uplink transmissions to the RNS 216 over the two transport channels DCH1 and DCH2 simultaneously. Four different transport format combinations are shown, although more or less transport format combinations can also be used. Each transport format combination can be identified by a corresponding transport format combination indicator (TFCI). For a TFCI having a value of TFCI1, the transport channels DCH1 and DCH2 can use the transport format combination of transport formats TF1 and TF3 respectively. Similarly for a TFCI having a value of TFCI3, transport channels DCH1 and DCH2 can use transport formats TF2 and TF5. Rather than communicate the full information embodied in table 800 with an accompanying data transport block, only the transport format combination indicator (TFCI) can provide the same information more efficiently. Different transport format combinations can prioritize voice and data traffic differently. The transport format combination specified by TFCI1 can prioritize voice and exclude data, while the TFC identified by TFC4 can minimize voice and maximize data. The UE 202 can choose one of the valid TFCs in table 802 during each successive TTI.

Figure 9:
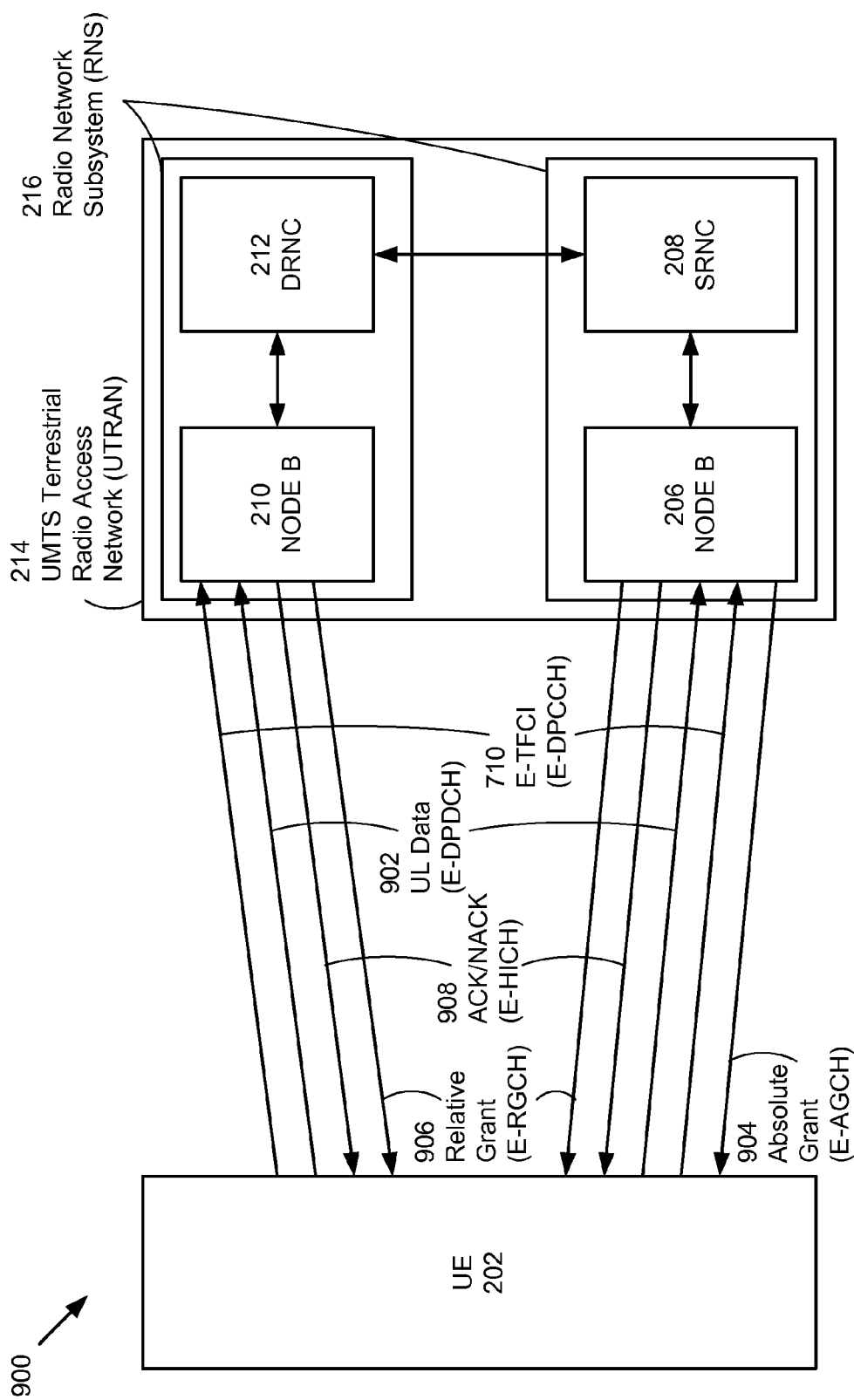
FIG. 9 illustrates communication of representative signals on physical layer channels between the mobile wireless communication device and the access portion of the wireless communication network.

Multiple factors can be used by the UE 202 when determining which TFC to use during a particular TTI. As shown in FIG. 9, the UE 202 can receive absolute grants 904 through an E-AGCH from a serving RNS 216 as well as relative grants 906 through an E-RGCH from the primary serving RNS 216 and from a secondary "drift" RNS 216. The RNS 216 in the communication network can determine the absolute grant 904 and the relative grant 906 based on information supplied by the UE 202, as well as other UE 202 operated by other users connected to the same RNS 216. Buffer depths at the UE 202 can be communicated indirectly using a "happy" bit. Mutual interference between different UE 202 at a receiver in the Node B 206/210 of the RNS 216 can be measured. Transmit power capabilities of the UE 202 can be known by or communicated to the RNS 216. After selecting a transport format combination, the UE 202 can send the uplink (UL) data 902 on the E-DPDCH physical data channel to the RNS 216 along with the selected E-TFCI 710 on the parallel E-DPCCH physical control channel.

Figure 10:
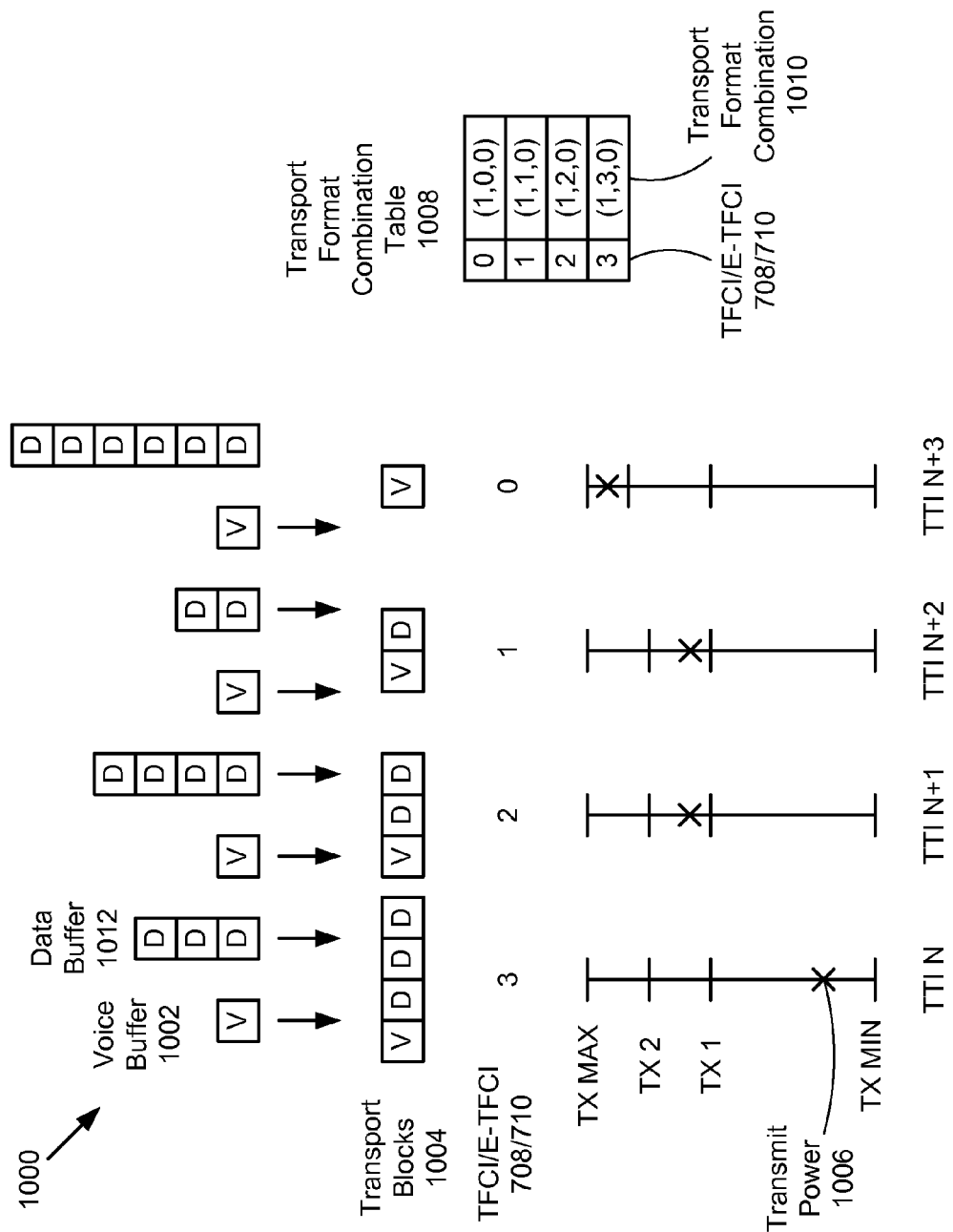
FIG. 10 illustrates correlating a transport format combination with transmit power and buffer depth.

FIG. 10 illustrates a representative embodiment 1000 for selecting a transport format combination (TFC) linked to an actual or estimated transmit power level 1006. A representative transport format combination table 1008 can include several transport format combinations 1010, each labeled by a TFCI/E-TFCI 708/710. Each transport format combination 1010 can represent a number of transport blocks 1004 taken from a voice buffer 1002, the number of transport blocks 1004 taken from a data buffer 1012 and an amount of signaling data. The number of transport blocks used of each type (voice or data) plus the inclusion (or exclusion) of signaling data can be indicated by the UE 202 to the RNS 216 by sending a TFCI/E-TFCI 708/710 having an appropriate value. For a TFCI/E-TFCI 708/710 with value 0, only a single voice transport block 1004 can be sent, while for a TFCI/E-TFCI 708/710 with value 3, one voice and three data transport blocks 1004 can be sent. A mixture of voice and data can be prioritized toward voice only (value 0) or increasing amounts of data (values 1, 2 and 3) by selecting the TFCI/E-TFCI 708/710 representing the mixture sought.

All of the values in the representative transport format combination table 1008 shown include TFCI/E-TFCI 708/710 values that correspond to transport format combinations 1010 that specify voice with varying amounts of data but no signaling. Other entries than those shown can also be included in the transport format combination table 1008, such as entries that include signaling in addition to voice and data or signaling only. For example, a transport format combination 1010 having a value of (1,0,1) can specify a voice packet plus signaling and a transport format combination 1010 having value of (0,0,1) can specify signaling alone without any voice or data packets. As described for the tables shown in FIG. 8, other transport format characteristics can be specified by using one or more transport format combination tables. The transport format combination table 1008 provides an exemplary embodiment for illustration to link a transmit power 1006 level and a fullness of a voice buffer 1002 and/or a data buffer 1012 to a selection of a value for the TFCI/E-TFCI 708/710 that can specify a set of transport format characteristics. Additional transport format characteristics can be specified, for example by increasing the number of entries in the transport format combination 1010 and by adding additional values for TFCI/E-TFCI 708/710.

During a combined voice and data call, in particular for systems that can use WCDMA/HSUPA technology, the UE 202 can select the TFCI/E-TFCI 708/710 accounting for transmit power 1006 and a depth of data in voice buffers 1002 and data buffers 1012. Combined voice and data calls can use a higher uplink transmit power than a voice only call. A transmit power 1006 used by the UE 202 can vary based on a transmission distance between the UE 202 and the RNS 216, which can affect received signal power levels at the RNS 216. The transmit power 1006 can also be adjusted by the RNS 216 to boost received signal power relative to a background noise and interference level present at the receiver of the RNS 216. To counteract a weak received signal power level, the UE 202 can increase it's transmit power level, subject to limits imposed by the RNS 216. When transmitting at higher transmit power levels, the UE 202 can select a TFCI/E-TFCI 708/710 having less data to minimize the increase in transmit power required for data as compared to voice transmissions. When transmitting at or near a maximum transmit power level, the UE 202 can select a TFCI/E-TFCI 708/710 that uses voice only with no data transmission.

By restricting data transmissions during periods of maximum transmit power for a combined voice and data call, the UE 202 can minimize (or eliminate) errors on a data connection while maintaining integrity of a concurrent voice connection. Call disconnects that can occur when a combined voice and data call is dropped because of errors on the data portion of the combined call can be thus avoided or minimized. Call performance for combined voice and data calls can be improved, as the voice call can remain active, while data transmissions can be delayed until conditions improve so that transmit power levels can be lowered.

As shown in FIG. 10, when the transmit power 1006 is estimated to be below a first threshold TX1 and above a minimum threshold TX MIN, the TFCI/E-TFCI 708/710 can be selected to have a value of 3 to transmit a voice packet from the voice buffer 1002 plus three data packets from the data buffer 1012. This value of TFCI/E-TFCI 708/710 in the TFC table 1008 can represent a maximum amount of data transported during a TTI N when combined with voice. The amount of data packets taken from the data buffer 1012 can also be based on the depth of the data buffer 1012. If only two packets exist in the data buffer 1012, then for the low transmit power 1006 between TX1 and TX MIN the TFCI/E-TFCI 708/710 can have a value of 2 rather than a value of 3, as there can be only sufficient data packets in the data buffer 1012 to support a transport block 1004 with one voice packet and two data packets. Thus the selection of the TFCI/E-TFCI can depend on the transmit power 1006 and also on the depth of one or more data buffers 1012 or voice buffers 1002.

As illustrated by FIG. 10, when the estimated transmit power can be between a first threshold TX 1 and a second threshold TX 2, nearer to the maximum transmit power TX MAX, the UE 202 can select a TFCI/E-TFCI 708/710 that results in less data packets transferred from the data buffer 1012 than when a lower transmit power can occur. During the TTI N+1, by selecting a TFCI/E-TFCI 708/710 having a value of 2, the UE 202 can transfer two data packets from the data buffer 1012 and one voice packet from the voice buffer 1002, even though four data packets can exist in the data buffer 1012. Less data packets than queued in the data buffer 1012 can be taken during a TTI when the transmit power 1006 exceeds a certain threshold. Similarly in TTI N+2, the UE can select a TFCI/E-TFCI 708/710 having a value of 1 resulting in one data packet transferred from the data buffer 1012 and one voice packet transferred from the voice buffer 1002. For the same transmit power 1006 level, a different TFCI/E-TFCI 708/710 can be selected based on the amount of data queued for transfer. The TFCI/E-TFCI 708/710 can be selected based on both the transmit power 1006 and on the amount of data available in one or more buffers awaiting transmissions at the UE 202. Finally in TTI N+3, when the transmit power 1006 exceeds the second threshold TX 2, the UE 202 can select the TFCI/E-TFCI 708/710 having a value of 0 that can result in only voice packets being transferred from the voice buffer 1002 and no data packets being transferred from the data buffer 1012. Effectively, the UE 202 can throttle the data partially or completely when the transmit power 1006 level falls within certain ranges. A voice connection can thus take priority over a simultaneous data connection under certain conditions, such as when operating the UE 202 at or near the maximum transmit power 1006 level.

The transmission of signaling information by the UE 202 to the RNS 216 can take priority over the transmission of voice packets or data packets. With signaling information ready for transmission, the UE 202 can include the signaling information in addition to the voice and/or data packets. For certain transmit power 1006 levels, such as at or near TX MAX, the UE 202 can select a TFCI/E-TFCI 708/710 that transmits signaling information only without voice or data packets. Thus signaling can be prioritized over voice, which in turn can be prioritized over data, by the UE 202.

Figure 11:
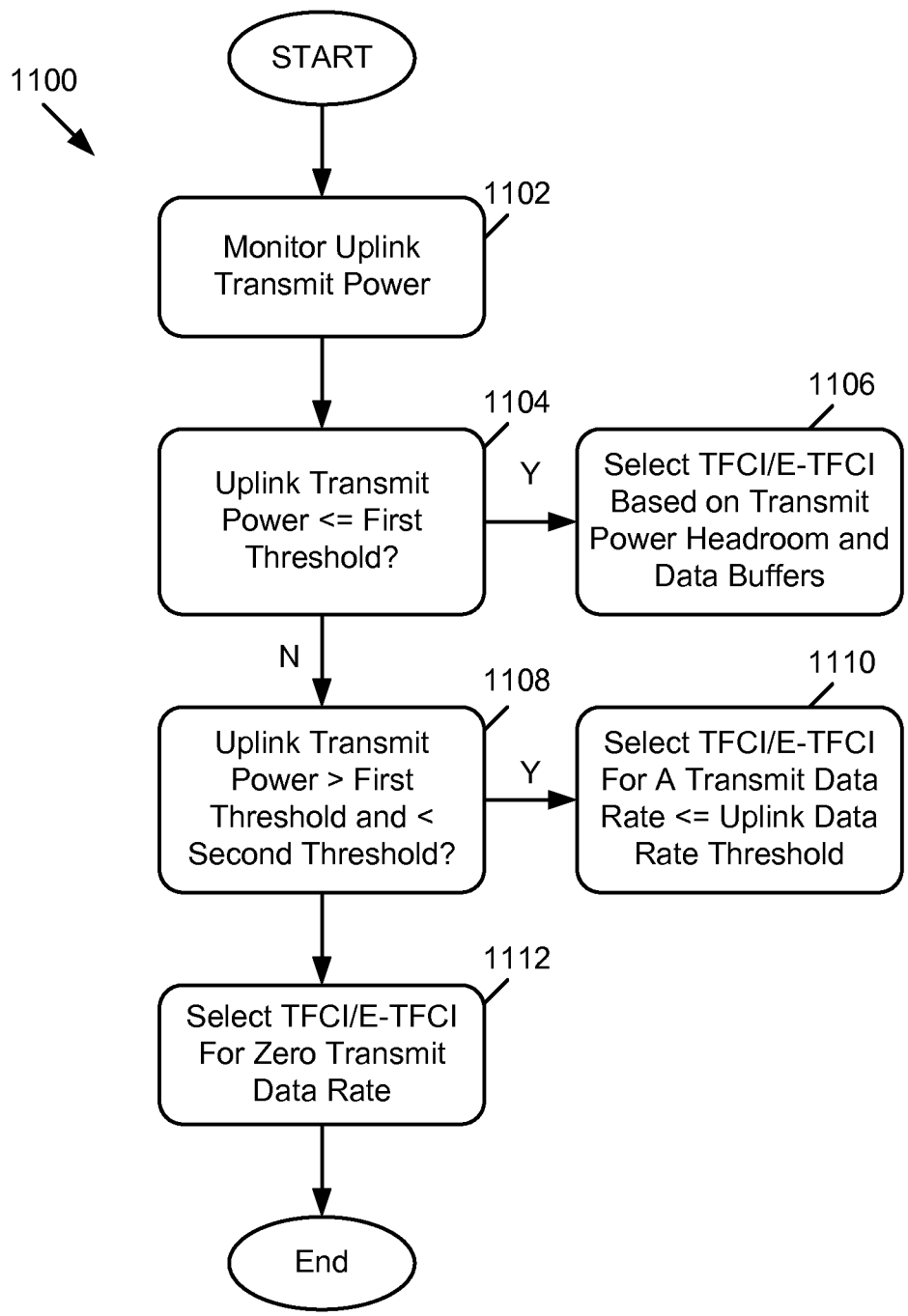
FIG. 11 illustrates a representative method to select a transport format combination for a transmit time interval by the mobile wireless communication device based on an uplink transmit power level.

FIG. 11 illustrates a representative method 1100 to select a transport format combination for a transmit time interval by the UE 202 operating in a wireless communication network 100 based on an uplink transmit power level. The UE 202 can be connected to one or more RNS 216 of the wireless communication network 100. The UE 202 can be connected through a voice connection, which can be circuit switched, and a data connection, which can be packet switched. The circuit switched voice connection and the packet switched data connection can be transported through separate radio access bearers between the UE 202 and the RNS 216. In step 1102, the UE 202 can monitor an uplink transmit power. The uplink transmit power can be an estimated transmit power for a current or one or more future transmit time intervals or a measure of transmit power for one or more past transmit time intervals. In step 1104, the UE 202 can determine if the monitored uplink transmit power equals or falls below a first threshold. If the UE 202 determines that the uplink transmit power is equal to or less than the first threshold, then in step 1106 the UE 202 can select a transport format combination indicator (TFCI) or enhanced transport format combination indicator (E-TFCI) based on an amount of available transmit power headroom and an amount of data buffered for transmission in the uplink direction. The available transmit power headroom can be calculated by the UE 202 as a difference between a maximum transmit power level and a nominal transmit power level during one or more transmit time intervals. In step 1108, the UE 202 can determine if the monitored uplink transmit power exceeds the first threshold and falls below a second threshold. If the UE 202 determines that the uplink transmit power is greater than the first threshold and less than a second threshold, then in step 1110, the UE 202 can select the TFCI/E-TFCI such that the uplink transmit data rate, e.g. the amount of packet switched data transmitted in the uplink direction during a transmit time interval, is less than or equal to a uplink data rate threshold. If instead the UE 202 determines that the uplink transmit power exceeds the second threshold, then in step 1112 the UE 202 can select the TFCI/E-TFCI such that the uplink transmit data rate is zero.

Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line used to fabricate thermoplastic molded parts. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The various aspects, embodiments, implementations or features of the described embodiments can be used separately or in any combination. The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for transport format combination selection in a mobile wireless communication device, the method comprising:
   in the mobile wireless communication device,
   when the mobile wireless communication device is connected to a wireless communication network through a first connection and a second connection simultaneously;
   monitoring an uplink transmit power level;
   selecting a first transport format combination that transmits frames over the first connection and not the second connection during a transmit time interval when the uplink transmit power level equals or exceeds a first threshold; and
   selecting a second transport format combination that transmits frames on both the first connection and the second connection during the transmit time interval when the uplink transmit power level equals or exceeds a second threshold and falls below the first threshold, wherein selecting the first transport format combination and the second transport format combination depends on an amount of frames awaiting transmission in buffers in the mobile wireless communication device.

2. The method as recited in claim 1, wherein the first and second transport format combinations are selected by the mobile wireless communication device from a transport format combination set specified by the wireless communication network.

3. The method as recited in claim 2, wherein the selected second transport format combination specifies a least non-zero rate of frame transmission over the second connection during the transmit time interval out of all of the transmit format combinations in the transmit formation combination set.

4. The method as recited in claim 1, the method further comprising:
maintaining one or more transmit buffers containing frames for transmission over the first connection and the second connection;
selecting a third transport format combination that transmits frames over the first connection and over the second connection during the transmit time interval when the uplink transmit power level falls below the second threshold, wherein the selection of the third transport format combination depends on an amount of frames contained in the one or more transmit buffers.

5. The method as recited in claim 4, wherein selecting the third transport format combination further depends on an amount of transmit power headroom.

6. The method as recited in claim 1, wherein the first connection is a circuit switched voice connection, and the second connection is a packet switched data connection.

7. The method as recited in claim 2, wherein the first transmit format combination requires a least amount of transmit power during the transmit time interval selected from the transmit format combinations specified by a transmit format combination table.

8. The method as recited in claim 2, wherein the second transmit format combination requires a least amount of transmit power during the transmit time interval selected from transmit format combinations having non-zero transmissions over the second connection during the transmit time interval.

9. A mobile wireless communication device comprising:
an application processor, and
a transceiver coupled to the application processor and connected to a wireless communication network by a first connection and a second connection, wherein the transceiver selects a transmission format by:
estimating an uplink transmit power level for transmissions during a transmit time interval;
when the estimated uplink transmit power level equals or exceeds a first threshold, selecting a first transmission format that specifies transmitting a non-zero amount of frames over the first connection and transmitting zero frames over the second connection during the transmit time interval; and
when the estimated uplink transmit power level equals or exceeds a second threshold and falls below the first threshold, selecting a second transmission format that transmits a non-zero amount of frames over both the first connection and the second connection during the transmit time interval,
wherein the first and second transmission formats are selected by the mobile wireless communication device from a set of transmission formats communicated to the mobile wireless communication device by the wireless communication network when establishing or when reconfiguring the first and second connections, and
wherein the second transmission format specifies a least non-zero amount of frames for transmission over the second connection selected from the set of transmission formats communicated by the wireless communication network to the mobile wireless communication device.

10. The mobile wireless communication device as recited in claim 9, wherein the transceiver further selects the transmission format by: monitoring an amount of frames stored in one or more buffers in the mobile wireless communication device awaiting transmission over the first and second connections; and selecting the first and second transmission formats based on the monitored amount of stored frames in addition to the estimated uplink transmit power level.

11. The mobile wireless communication device as recited in claim 10, wherein the transceiver further selects the transmission format by: selecting a third transmission format that transmits a non-zero amount of frames over the first connection and over the second connection during the transmit time interval when the uplink transmit power level falls below the second threshold, wherein the selection of the third transmission format depends on the amount of frames stored in the one or more buffers.

12. The mobile wireless communication device as recited in claim 11, wherein the selecting the third transmission format further depends on an amount of transmit power headroom.

13. The mobile wireless communication device as recited in claim 9, wherein the first connection is a circuit switched voice connection, and the second connection is a packet switched data connection.

14. The mobile wireless communication device as recited in claim 9, wherein the first transmission format requires a least amount of transmit power during the transmit time interval selected from the set of transmission formats communicated to the mobile wireless communication device from the wireless communication network.

15. The mobile wireless communication device as recited in claim 9, wherein the second transmission format requires a least amount of transmit power during the transmit time interval selected from a subset of transmission formats in the set of transmission formats communicated to the mobile wireless communication device from the wireless communication network, the subset having specifying non-zero transmission rates over the second connection during the transmit time interval.

16. A computer readable medium for storing non-transitory computer program code executable by a processor in a mobile wireless communication device for selecting a transmission format, wherein the executing of the computer program code causes the processor to perform operations comprising:
when the mobile wireless communication device is connected to a wireless communication network through a first connection and a second connection simultaneously;
estimating an uplink transmit power level;
selecting a first transmission format that transmits frames over the first connection and does not transmit frames over the second connection during a transmit time interval when the estimated uplink transmit power level equals or exceeds a first threshold, wherein the first transmission format requires a least amount of transmit power during the transmit time interval selected from the set of transmission formats; and
selecting a second transmission format that transmits frames over the first connection and over the second connection during the transmit time interval when the estimated uplink transmit power level equals or exceeds a second threshold and falls below the first threshold.

17. The computer readable medium as recited in claim 16, wherein the first transmission format and the second transmission format are selected by the mobile wireless communication device from a set of transmission formats specified by the wireless communication network.

18. The computer readable medium as recited in claim 16, wherein the first connection is a circuit switched voice connection and the second connection is a packet switched data connection.

19. The computer readable medium as recited in claim 16, the operations further comprising:
- maintaining one or more transmit buffers that contain frames for transmission over the first and second connections;
- selecting a third transmission format that transmits frames over the first connection and over the second connection during the transmit time interval when the estimated uplink transmit power level falls below the second threshold, wherein the selection of the third transmission format depends on an amount of frames contained in the one or more transmit buffers.

20. The computer readable medium as recited in claim 19, wherein selecting the third transmission format further depends on an amount of transmit power headroom.

21. The computer readable medium as recited in claim 17, wherein the second transmission format requires a least amount of transmit power during the transmit time interval selected from a subset of transmission formats in the set of transmission formats specified by the wireless communication network having non-zero transmissions over the second connection.

* * * * *